(12) United States Patent
Demura et al.

(10) Patent No.: US 8,412,891 B2
(45) Date of Patent: Apr. 2, 2013

(54) ARBITRATED ACCESS TO MEMORY SHARED BY A PROCESSOR AND A DATA FLOW

(75) Inventors: Masayuki Demura, Ebina (JP); Hisato Matsuo, Yokohama (JP); Keisuke Tanaka, Machida (JP)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 12/916,668

(22) Filed: Nov. 1, 2010

(65) Prior Publication Data

US 2011/0125946 A1 May 26, 2011

(30) Foreign Application Priority Data

Nov. 24, 2009 (JP) ................................. 2009-266286

(51) Int. Cl.
*G06F 12/12* (2006.01)
*G06F 13/18* (2006.01)
*G06F 13/34* (2006.01)

(52) U.S. Cl. ............ 711/151; 711/158; 710/35; 710/40; 710/52; 710/111; 710/244

(58) Field of Classification Search ............. 711/151, 711/158; 710/35, 40, 52, 111, 244
See application file for complete search history.

(56) References Cited

U.S. PATENT DOCUMENTS

| | | | | |
|---|---|---|---|---|
| 5,423,020 A | * | 6/1995 | Vojnovich | 710/22 |
| 5,878,280 A | * | 3/1999 | Lucht | 710/52 |
| 6,694,501 B2 | * | 2/2004 | Chang et al. | 716/122 |
| 2002/0062408 A1 | * | 5/2002 | Jahnke et al. | 710/22 |
| 2012/0173786 A1 | * | 7/2012 | Simon et al. | 710/308 |

FOREIGN PATENT DOCUMENTS

| | | |
|---|---|---|
| JP | 11120124 A | 4/1999 |
| JP | 2003345530 A | 12/2003 |
| JP | 2006012032 A | 1/2006 |
| JP | 2006127408 A | 5/2006 |
| JP | 2008027305 A | 2/2008 |

* cited by examiner

*Primary Examiner* — John Lane
(74) *Attorney, Agent, or Firm* — Edward J. Lenart; Cynthia G. Seal; Biggers & Ohanian, LLP

(57) ABSTRACT

Memory access arbitration allowing a shared memory to be used both as a memory for a processor and as a buffer for data flows, including an arbiter unit that makes assignment for access requests to the memory sequentially and transfers blocks of data in one round-robin cycle according to bandwidths required for the data transfers, sets priorities for the transfer blocks so that the bandwidths required for the data transfers are met by alternate transfer of the transfer blocks, and executes an access from the processor with an upper limit set for the number of access times from the processor to the memory in one round-robin cycle so that the access from the processor with the highest priority and with a predetermined transfer length exerts less effect on bandwidths for data flow transfers in predetermined intervals between the transfer blocks.

11 Claims, 8 Drawing Sheets

ARBITRATED ACCESS TO MEMORY SHARED BY A PROCESSOR AND A DATA FLOW

CLAIM OF PRIORITY

This application claims priority under 35 U.S.C §119 to Japanese Patent Application No. 2009-266286 filed Nov. 24, 2009, the entire text of which is specifically incorporated by reference herein.

BACKGROUND OF THE INVENTION

1. Field of the Invention

The field of the invention is data processing, or, more specifically, methods and apparatus for access arbitration of a shared memory of an information apparatus (e.g., storage device) in shared use as a main memory to be accessed for the driving of a CPU (processor) and as a buffer for data flows.

2. Description of Related Art

Power consumption and cost reduction are key issues for a storage device (e.g., a tape recorder or tape drive). A typical storage device is equipped with a Large Scale Integration ('LSI') device such as an Application Specific Integrated Circuit (hereinafter "data-flow ASIC" or simply "ASIC") for a processor used by firmware and data flows for executing various processes on data. The ASIC uses a Dynamic Random Access Memory or 'DRAM' as a buffer or as a main memory. Reducing the number of DRAM memories contributes to the reduction of power consumption, cost, and footprint.

The peak power consumption of a single DRAM chip is around 0.5 W during its operation, and accounts for a large proportion of the entire power consumption in one device system. In mid-range products, memory cost is also not a negligible factor at present. Since there is a demand for reduction in size of a mid-range tape drive, the number of components needs to be reduced for the reduction of circuit board space.

FIGS. 1A and 1B each illustrate a configuration of a circuit board including a processor and an ASIC which executes an arbiter operation to arbitrate among accesses to a DRAM memory from transfer blocks in a storage device. FIG. 1A shows a conventional configuration which includes dedicated memories respectively for data flows and the processor (data flow buffer and main memory) and an arbiter arbitrating among accesses from a buffer for data flows. The arbiter for data flows shown in FIG. 1A adjusts a required bandwidth in such a way as to allow an access from a block requiring a high transfer rate to use a large burst length per access acceptance.

The integration of a processor and an LSI such as a data-flow ASIC has been in progress for the reduction of power consumption and cost of an information apparatus. Along with this, the reduction of the number of DRAM memories by the sharing of a memory has also been studied. Actually, some personal computer (PC) systems employ a memory used both as a main memory and as a graphic memory. Thus, a DRAM memory of a storage device is also conceivable to be accessed from a processor and transfer blocks in a sharing manner.

FIG. 1B illustrates a DRAM memory shared between an access from the processor and data flow transfers, and an ASIC including an arbiter enabling the sharing of the memory. In this shared memory configuration, a single DRAM memory chip is used both as a data buffer for data flows and as a main memory for the processor. In the shared memory, usable areas of one DRAM memory are physically separated from each other. In the conventional configuration, multiple blocks make access requests to the buffer memory, and the arbiter function of the ASIC controller allows the access requests sequentially in a round-robin fashion. Here, the following problems need to be considered in the using of a shared memory both as a main memory and as a data buffer in the storage device, such as a tape drive, having the above configuration.

Firmware which uses a processor controls hardware such as a data-flow ASIC to execute data transfers to and from media. Since the code of the firmware itself is placed in a main memory, an access to the main memory occurs in the operation of the firmware. The delay time from when an access request to the main memory is made to when the request is completed is a processor process wait time. If this process wait time is long, the performance of the processor is degraded. In the case of a storage device, for example, host transfers, media transfers, and servo processes get stuck, resulting in the degradation of the performance of the entire device. In the case of a tape drive, for example, problems occur such as the halt of a host process, degradation in servo follow-up performance due to the delay of a servo process, and significant degradation in tape transfer performance due to a backhitch (rewind operation). For this reason, a bandwidth needs to be assigned to an access request from the processor with a high priority. As a conventional technique, there is a method of: giving a high priority to a memory access from a processor; and, upon arrival of an access request from the processor, preferentially allowing this processor access request after completion of a data transfer executed at the time of the arrival.

With the above method, if the data transfers for the accesses get stuck, this may eventually cause the halt of a host transfer and the reduction in media transfer performance. Data buffer architecture needs to be designed to satisfactorily allocate necessary bandwidths to data transfer requests from all the blocks when the data transfer requests occur at the same time. Also, in a configuration where a main memory is shared with a data buffer, requirements for data flow transfers need to be met. The method of allowing transfers sequentially in a round-robin fashion is employed when there are access requests of data flows from multiple functional blocks as described above.

For example, Japanese Patent Application Publication No. Hei 11-120124 (Patent Literature 1) relates to a bus access arbitration system between accesses to a data buffer from a host side and a CD medium side. In controlling accesses to the data buffer from multiple blocks in a CD drive, the bus arbitration system gives a priority and limitation on the number of access times to access from each of the blocks. Further, with transfer rate regulation and limitation on the number of access times set for both a transfer from the host and a transfer to the CD medium, this system grants a bandwidth to the host side when a host transfer is required, or to the medium side when a media transfer is required.

SUMMARY OF THE INVENTION

Memory access arbitration devices, methods, and products are described for allowing a shared memory to be used both as a memory for a processor of an information apparatus (such as, for example, a tape drive) and as a buffer for data flows of the information apparatus, including a memory; a plurality of functional blocks each of which handles a data flow from and to the memory; a processor which uses the memory as a main memory; and an arbiter unit which arbitrates among accesses to the memory from the functional blocks and the processor, wherein the arbiter unit makes assignment for access requests to the memory from the plurality of functional blocks in units of predetermined transfer lengths sequentially in a round-robin fashion, (a) divides each of data transfers from the functional blocks into transfer blocks of a predetermined transfer length (transfer block length), and transfers the transfer blocks in one round-robin cycle in accordance with bandwidths required for the data transfers from the functional blocks, (b) sets a priority of each of the plurality of transfer blocks of the data transfers in a programmable way so that the transfer blocks from the functional blocks have different priorities and that the bandwidths required for the data transfers from all the functional blocks are met by alternate transfer of the transfer blocks from the different functional blocks, and (c) executes an access from the processor with an upper limit set for the number of access times from the processor to the memory in one round-robin cycle so that the access from the processor with the highest priority and with a predetermined transfer length (processor transfer length) exerts less effect on bandwidths for data flow transfers from the functional blocks in predetermined intervals between the transfer blocks.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXAMPLE EMBODIMENTS

Figure 1:
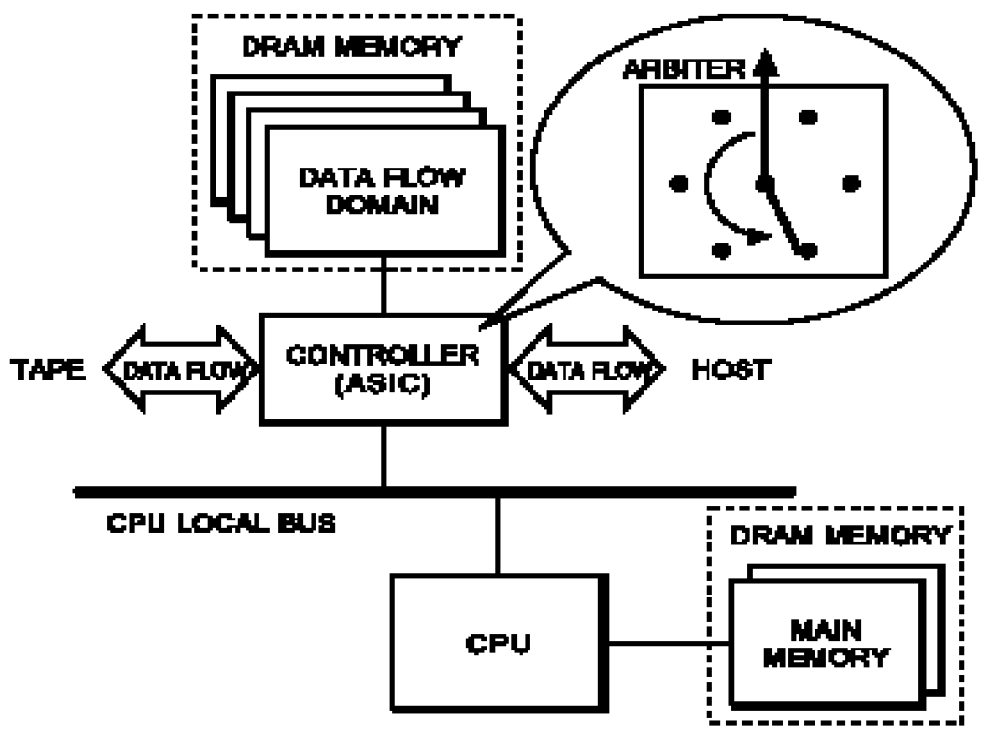
FIGS. 1A and 1B illustrate each a prior art configuration of a circuit board including a processor and an ASIC which executes an arbiter operation to arbitrate among accesses to a DRAM memory from transfer blocks in a storage device.
Figure 1:
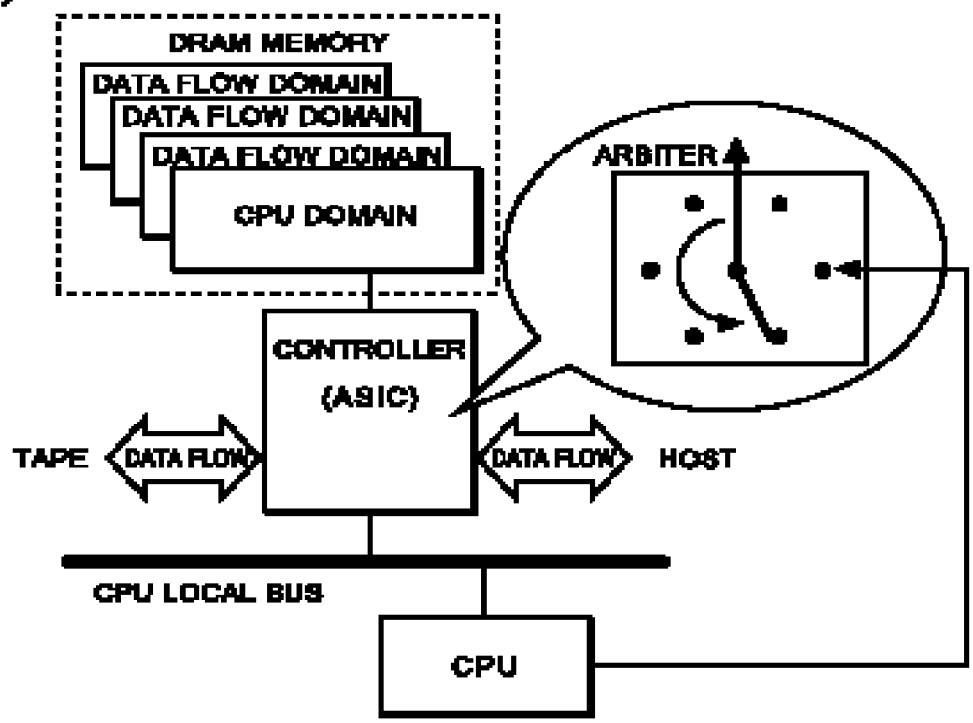

Description is given of typical example embodiments, sometimes referred to simply as 'example' or 'examples' which achieve an arbiter of the present invention for memory accesses from data flows and a processor in a tape recorder.

The examples are shown for the purpose of illustration only, and do not intend to limit in any way the overall scope of the present invention. An example tape recorder or tape drive receives requests for access to a buffer from multiple access blocks, and needs to secure bandwidths required for the respective accesses. An arbiter (buffer arbiter function) included in an ASIC is implemented in a round-robin fashion. The arbiter of the present invention solves the above problems by having the following functions.

a. To allow access requests with an equal burst transfer length or smaller.
b. To allow an access multiple times in one round-robin cycle for an access requiring a large bandwidth.
c. To allow an access at least once in one round-robin cycle for an access requiring a small bandwidth.
d. To allow an access with the highest priority for a main memory access from a processor, but set the maximum number of access times within one round-robin cycle for this access so that the access would not interfere with the bandwidths for data flows.

By dividing a high-bandwidth burst transfer into multiple transfers with the function a, the arbiter of the present invention is capable of reducing the processing delay (latency) of a processor access. The arbiter divides a burst transfer (data transfer) from each of multiple data-flow functional blocks into transfers of a small transfer length (transfer block length). By transferring the transfer block obtained by the division of a large data transfer multiple times in a round-robin cycle, the arbiter can guarantee required transfer rates of functional blocks. Here, when a data transfer of one functional block is divided into multiple transfer blocks, multiple transfer blocks of the other functional blocks also exist. The arbiter of this example is capable of assigning priorities to multiple transfer blocks from one functional block in a programmable way, in order to allow transferring both the transfer blocks from the one functional block and transfer blocks from the other functional blocks while associating them with each other. The arbiter changes the priorities in a programmable way as needed in order to guarantee the performance of data transfers from multiple functional blocks as a whole.

With the function a, the arbiter reduces the latency of a main memory access to the minimum when there is an access request from a processor. However, a too small transfer block rather results in the lack of required data transfer performance. With the functions b and c, a required bandwidth for a buffer access is also met in data buffer transfer. With the function d, the arbiter of the present invention performs assignment for a memory access from a processor with the highest priority. The arbiter needs to determine a required bandwidth and the number of assignments for a processor access so as not to affect buffer accesses from functional blocks for data transfers.

Optimal values for parameters such as a burst transfer length (transfer block length) for the data transfers and the number of processor accesses are different depending on system requirements such as a required bandwidth and tolerable latency. With the functions a to d, the arbiter converts a bus transfer into multiple transfer blocks, and inserts, in the transition between multiple transfer blocks, a processor access predetermined times in one round-robin cycle. The arbiter cannot maintain the performance of transfers from functional blocks if inserting a processor access every time the transfer of one transfer block finishes. Accordingly, the arbiter needs to determine the number of processor accesses in one round-robin cycle in consideration of the size and the number of transfer of a transfer block and the performance of functional blocks. The present invention achieves a programmable arbiter capable of changing the following setting in accordance with system requirements of a tape drive and others.

1. Setting of the order (priorities) of accesses in a round-robin cycle. In a case where multiple access requests from a single block are allowed, the order (priorities) of allowing transfer blocks for these access requests in a round robin cycle is also set.
2. Setting of the maximum burst length (transfer block length) to be allowed for each access per transfer. The maximum burst length of a transfer block is made settable in accordance with the tolerable latency of a processor access.
3. Setting of the maximum transfer bandwidth for a processor access. The maximum transfer bandwidth for a processor access is provided since a too large transfer bandwidth for a processor access may affect a buffer access.

Figure 2:
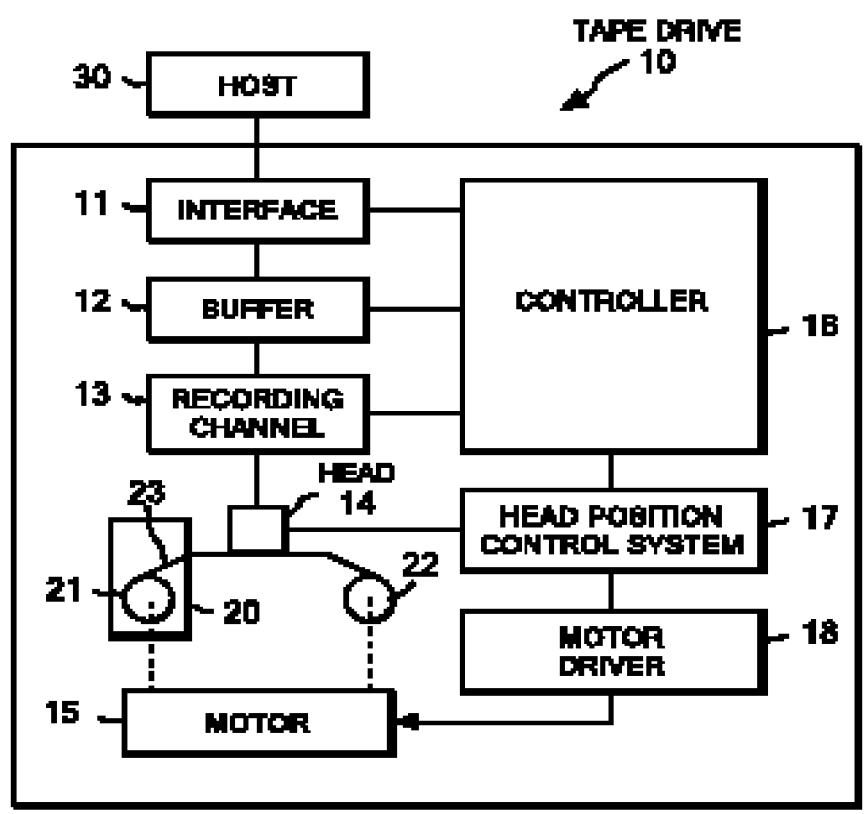
FIG. 2 sets forth a functional block diagram of an example tape drive 10 used to arbitrate shared memory in shared use as a main memory accessed by a CPU and as a buffer for data flows according to embodiments of the present invention.

For further explanation, FIG. 2 sets forth a functional block diagram of an example tape drive 10 used to arbitrate shared memory in shared use as a main memory accessed by a CPU and as a buffer for data flows according to embodiments of the present invention. The tape drive 10 includes an interface 11, a buffer 12, a recording channel 13, a tape 23, a head 14, reels 21 and 22, a cartridge 20, a motor 15, a controller 16, a head position control system 17, and a motor driver 18. The interface 11 communicates with a host 30.

The interface 11 receives, from the host 10, a command to write data to be transferred to the buffer 12, and a command to write data of the buffer 12 to the tape 23. For example, the interface 11 is compliant with a communication standard such as SCSI or Fibre Channel.

The buffer 12 is a memory which accumulates data to be written to the tape 23. The buffer 12 is divided into segments of a fixed length. Each segment corresponds to one dataset on the tape 23. A dataset has a data structure in which a product code formed of a C1 parity and a C2 parity is added. A dataset has a Data Set Information Table (DSIT) including, as attribute information, information such as partition information of multiple records (data pieces) included in the dataset. A processor included in the controller 16 generates a DSIT for each dataset, and the DSIT is included in the dataset. The generation of a DSIT denotes that the processor can access directly to the data buffer, execute a firmware, and add data management information.

The buffer 12 is called a ring buffer in the sense that it receives data to the last segment and then starts receiving data again from the first segment. Data of any length is transferred to the tape drive 10 from the host 30. Even when the host 30 transfers sets of data of a fixed length, a data length is different from one set of data to another if data compression is carried out thereon. These sets of transfer data are accumulated sequentially in the segments of the buffer 12. The recording channel 13 is a communication path for writing, to a tape medium as datasets, the data of the segments filled with the sets of data of various sizes. The data accumulated in the buffer 12 is written to the tape medium as a dataset on a segment basis. The writing is carried out at the timing when all the segments are completely filled with data.

The tape 23 is a recording medium serving as data recording means. The data passed via the recording channel 13 is written to the tape 23 as datasets by the head 14. The tape 23 is wound around the reels 21 and 22 and moved vertically in a direction from the reel 21 to the reel 22, or in a direction opposite thereto, along with the rotation of the reels 21 and 22. The cartridge 20 is a container for housing the reel 21 around which the tape 23 is wound. Another cartridge which is the same as the cartridge 20 may be provided for housing the reel 22. The motor 15 rotates the reels 21 and 22.

The controller 16 controls the entire tape drive 10. The controller 16 controls the writing and reading of data to and from the tape 23, according to the command received by the interface 11 from the host 30. The controller 16 also controls the head position control system 17 and the motor driver 18. The head position control system 17 tracks any desired track. When the head 14 is in need of moving to another track, the head position control system 17 performs electrical control such that the head 14 may be moved to the track. The motor driver 18 may be connected to the controller 16 directly.

Figure 3:
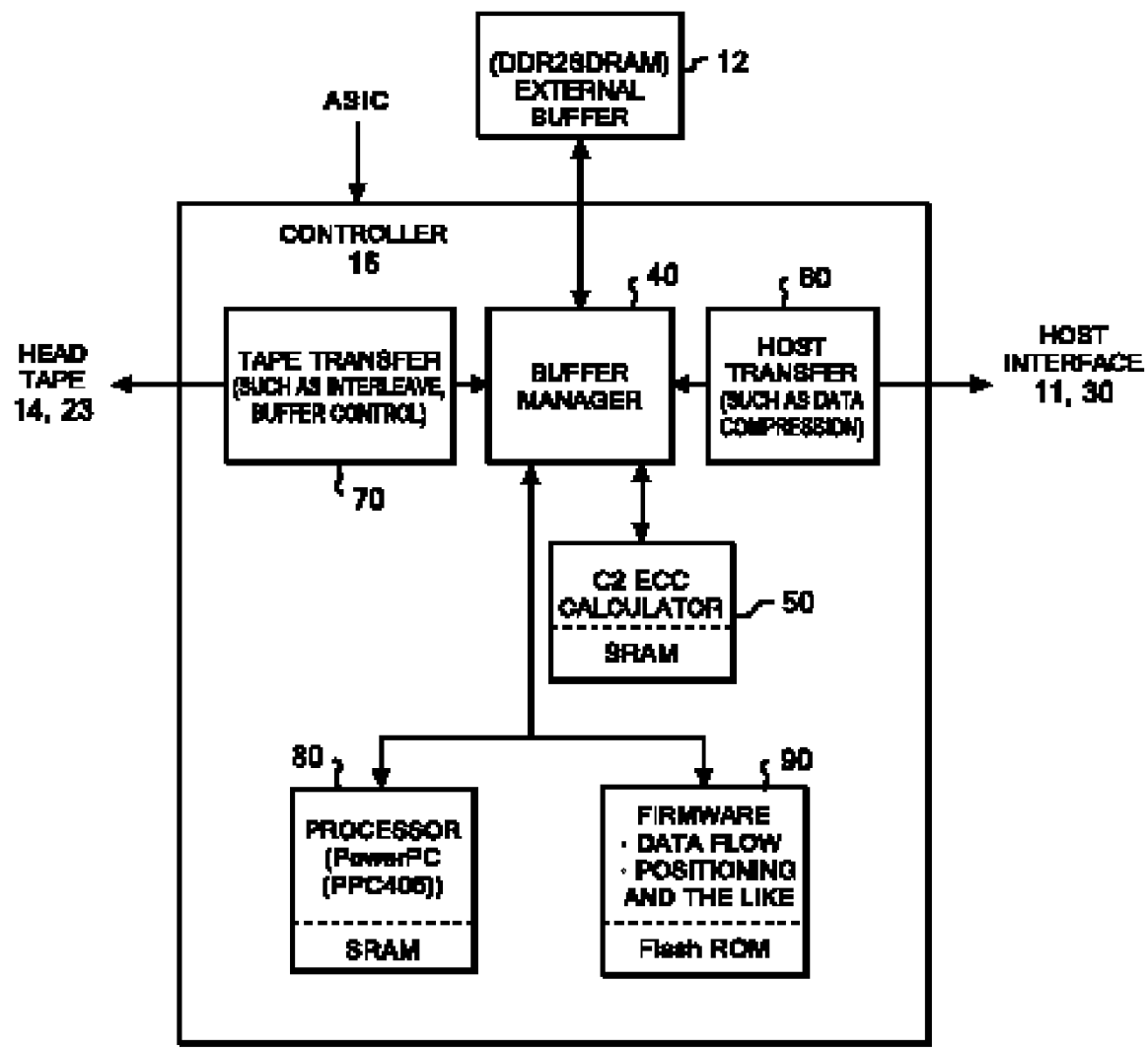
FIG. 3 illustrates a circuit configuration (ASIC) for performing data flow control and the like of the tape drive in arbitrating access to shared memory according to embodiments of the present invention.

FIG. 3 illustrates a configuration of circuit blocks (functional blocks) which perform data flow control and the like of the tape drive 10 (ASIC). The controller 16 includes a processor 80 which performs various control, a Flash ROM 90 which holds firmware, a buffer manager 40, and functional blocks such as a tape transfer block 70, a host transfer block 60, and a C2ECC calculator (error correction) block 50. The tape transfer block 70 is connected to the tape 23 and the read/write head 14. The host transfer block 60 is connected to the host 30. The controller (ASIC) 16 controls relations among the tape medium 23, the head 14, the host 30, and the external buffer 12. In particular, the buffer manager 40 has a function to arbitrate memory accesses between the external buffer 12 and each of the tape transfer block 70, the host transfer block 60, the C2ECC calculator block 50, and the processor 80.

Description is now given of, for example, a data transfer flow in which data is transferred from the host 30 and written to the tape 23. Data from the host transfer block 60, i.e., data written by the host 30 is once written to the external buffer 12 via the buffer manager block 40. The buffer manager block 40 requires a high bandwidth for processing data transfer access from each of the functional blocks 50, 60, and 70 to the external buffer 12 as a high-speed pipeline process. The external buffer 12 is, for example, a double data rate, type-2, synchronous dynamic random access memory ("DDR2 SDRAM") with a bus width of 4 byte or 8 byte. The data written to the external buffer 12 is transferred to the SRAM of the C2ECC calculator 50. The C2ECC calculator 50 corrects errors of all the data, and writes the corrected data back to the external buffer 12. The buffer manager 40 has a function, as a data-flow controller, to switch the bus among the functional blocks 50, 60, and 70 in a time-sharing manner so that the functional blocks may access the external buffer 12 effectively. The C2ECC calculator 50 has a strict requirement in terms of processing time because of its structure of writing the data read from the external buffer 12 back to the external buffer 12.

In order to process data transfers requested by the respective functional blocks equally in a pipeline manner, it is necessary to secure bandwidths required for the respective transfers from the blocks. In a configuration where a processor controls host transfers and media transfers, data is temporarily stored in an external buffer, and then sequentially processed. In the case of the writing of data from a host to a storage device, for example, the data from the host is first stored in the external buffer. Then, for the addition of an error correction code (hereinafter ECC), the data is read out from the external buffer and transmitted to an ECC calculator. An ECC parity obtained by calculation by the ECC calculator is again stored in the external buffer. The data is thereafter read out from the external buffer again for the transfer to the media. For a single write or read process, a buffer manager executes multiple accesses to the external buffer through multiple functional blocks. Moreover, these processes are executed in a pipeline manner. Accordingly, multiple access requests to the external buffer are generated at the same time.

Figure 4:
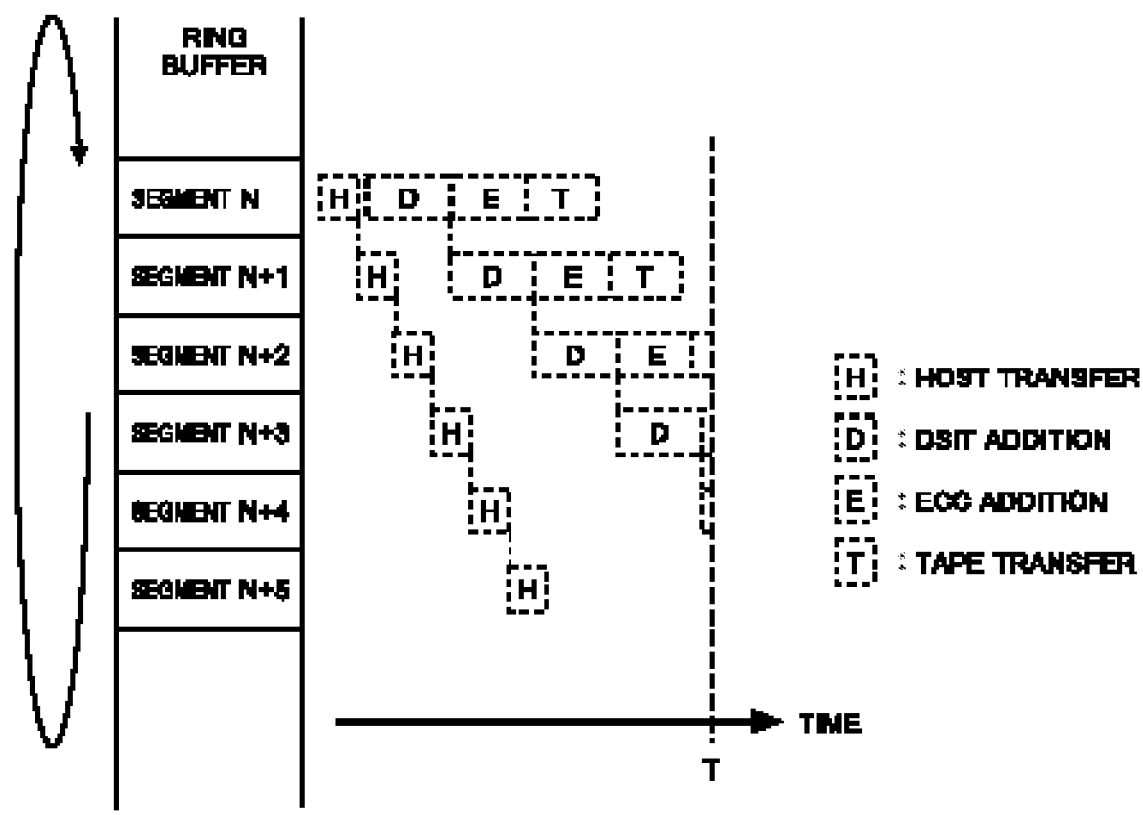
FIG. 4 illustrates a pipeline process of data transfer blocks executed for the generation of multiple segments (datasets), useful in arbitrating access to shared memory according to embodiments of the present invention.
Figure 7:
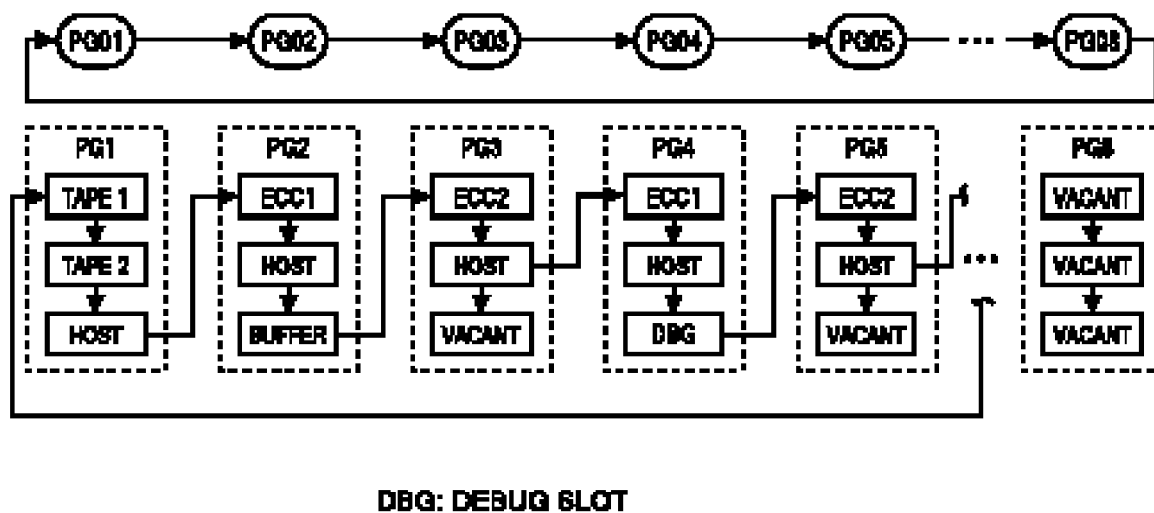
FIG. 7 is a conceptual diagram of a programmable arbiter which sets transfer orders in arbitrating access to shared memory according to embodiments of the present invention.

FIG. 4 illustrates a pipeline process of the data transfer blocks executed for the generation of multiple segments (datasets). The segments (segments N, N+1, N+2, N+3, ...) are data flows for generating datasets. The segments N, ... have a time axis from the left to the right. First, the functional blocks access the buffer in the order from an "H" (host) transfer, a "D" (DSIT generation) transfer, an "E" (C2ECC) transfer, and a "T" (tape) transfer to generate one dataset. Sets of data in the multiple segments are subjected to transfer processes for accesses from the blocks in a pipeline manner, as shown in FIG. 4. The transfers of the functional blocks will be described in a section describing a programmable arbiter for executing a pipeline process, which is shown in FIG. 7. In this example, since the host transfer (H) is a high-bandwidth transfer as compared to the other transfers (D, T, E), the host transfer is divided into multiple transfer blocks for the guarantee of its transfer rate. Each of the transfer blocks of the host transfer (H) is assigned a priority in consideration of priorities of the transfer block and the other transfers (T, D, E).

Figure 5:
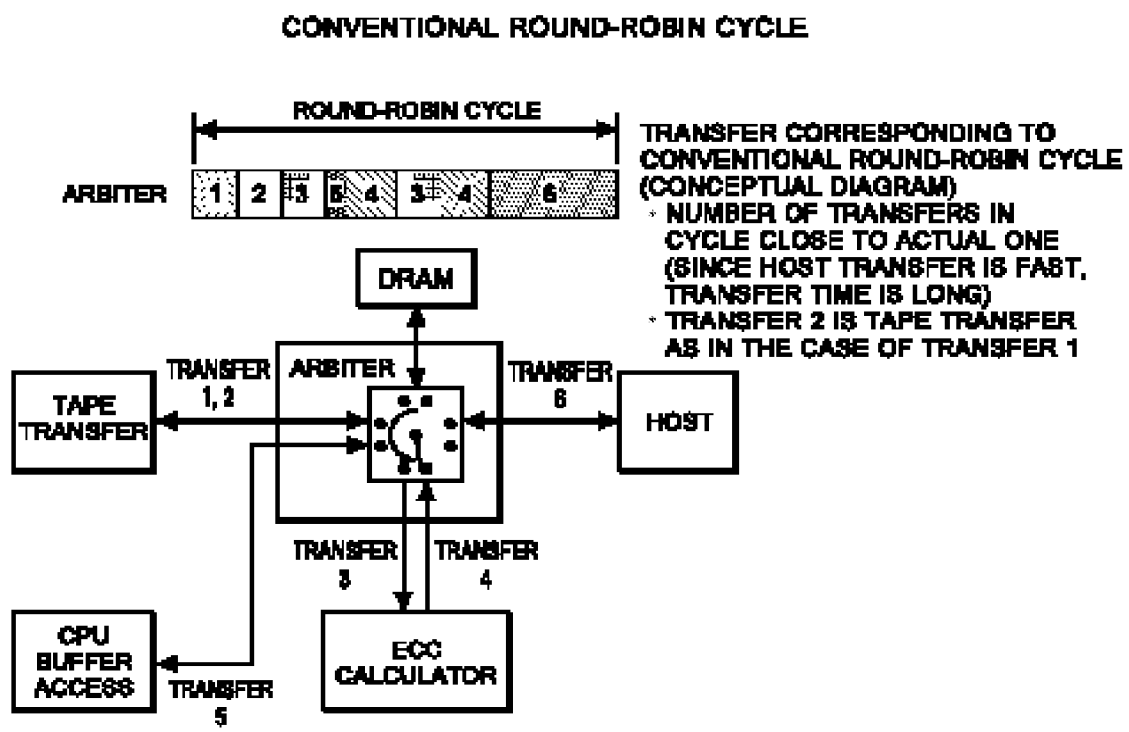
FIG. 5 is a conceptual diagram illustrating how data flow transfers are assigned bandwidths by a conventional arbiter of a tape drive in arbitrating access to shared memory according to embodiments of the present invention.

FIG. 5 is a conceptual diagram illustrating how data flow transfers are assigned bandwidths by a conventional arbiter of a tape drive. The horizontal axis indicates time as in the case of FIG. 4. In the conventional configuration, multiple accesses are allowed for a block requiring a high-bandwidth transfer, and thereby high-bandwidth requirements are met. Transfer 1 and Transfer 2 are of data formats of different generations of the tape drive. The single tape drive supports two formats. In practice, the arbiter never allows consecutive access for a single functional block in terms of the overall transfer efficiency.

Figure 6:
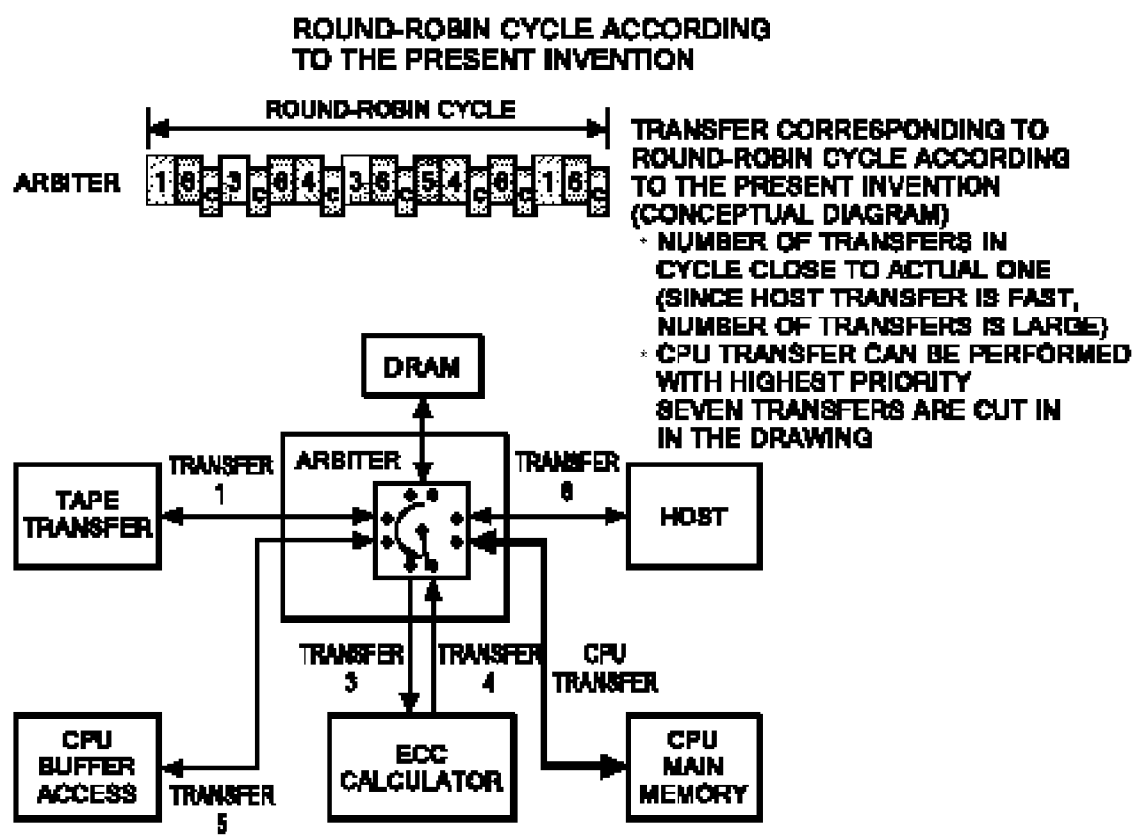
FIG. 6 illustrates an example arbitration according to embodiments of the present invention of access to a DRAM memory shared by a processor and data flows.

FIG. 6 illustrates the example of the present invention, in which arbitration is performed on accesses to the DRAM memory shared by the processor and data flows. The horizontal axis indicates time as in the case of FIG. 4. Since a host transfer 6 is a high-bandwidth transfer as compared to the other transfers (1, 3, 4, 5), the host transfer 6 is divided into multiple transfer blocks 6 and the transfer block obtained by the division is transferred multiple times (for example, six times) in one cycle, for the guarantee of its transfer rate. Each of the transfer blocks 6 of the host transfer is assigned a priority in consideration of the priority of the transfer block and the other transfers (1, 3, 4, 5) related to the transfer block. In FIG. 6, Transfer 2 shown in FIG. 5 is omitted.

Further, a box "C" indicates a processor access (main memory access). A processor access request is immediately executed with the highest priority. In the FIG. 6 example, processor access is granted seven times per one round-robin cycle. Assuming that a processor access is granted eight times or more within one cycle, the processes of Transfers 1, 3, 4, 5, and 6 may get stuck and fail to meet their required bandwidths, depending on the system requirements of an information apparatus to which the present invention is applied. Processor accesses occur by firmware (originally built in the ROM shown in FIG. 3) execution which executes various processes such as positioning control and data flows for the driving of the tape drive. Upon arrival of a processor access request, this processor access needs to wait till the end of the current transfer. However, since the maximum burst length of a single transfer block is limited to a predetermined transfer block length, processor access latency falls within the burst length. For this reason, even if a memory is shared by data flow accesses and processor accesses, an information apparatus to which the present invention is applied hardly suffers from delay of firmware execution, and is thus less likely to affect processes such as data flow process and servo processes.

Programmable Arbiter

FIG. 7 is a conceptual diagram of a programmable arbiter which sets transfer orders (priority). The arbiter is formed of N (N=8 in this example) state machines, and each state machine includes M (M=3 in this example) slots. Each slot of the state machines may be assigned any functional block to access the buffer. Moreover, multiple transfer blocks of each functional block may be assigned to multiple slots in different state machines. The arbiter lets an idle state machine stand by (idle state), and upon reception of access requests from transfer blocks, assigns the transfer blocks to the slots in the state machines in the order of priority. "Vacant" denotes that the corresponding slot is in a stand-by state (idle state).

Consider a case, for example, where the arbiter receives during its idle time access requests from Tape 1 and ECC 1. In this case, Tape 1 is assigned to State machine PG1 of higher priority. Accordingly, the arbiter allows transfer of Tape 1 before transfer of ECC1 assigned to PG2. A block of the highest priority turns to Tape 2 after the transfer of Tape 1 of PG1 is finished. Tape 1 and Tape 2 have data formats of different generations of the tape drive. The single tape drive supports two formats. When a request from the host comes in here, the request from ECC 1 sits in limbo. Since the priority of the first host transfer is higher than that of the transfer of ECC 1, the host transfer of PG1 is executed. After the host transfer of PG1 is finished, a block of the highest priority turns to ECC 1 located at the first slot of PG2. Here, since the transfer request from ECC 1 still sits in limbo, the transfer of ECC 1 is executed. In this manner, the arbiter allows accesses from the functional blocks (such as the host, tape, and ECC) assigned to the slots while changing priority of the functional blocks. The process goes through the state machines from PG1 to PG8, which constitutes one round-robin cycle. In this example, since a host transfer is a high-bandwidth transfer, the host transfer is assigned to five slots, in other words, is executed five times in one round-robin cycle.

Figure 8:
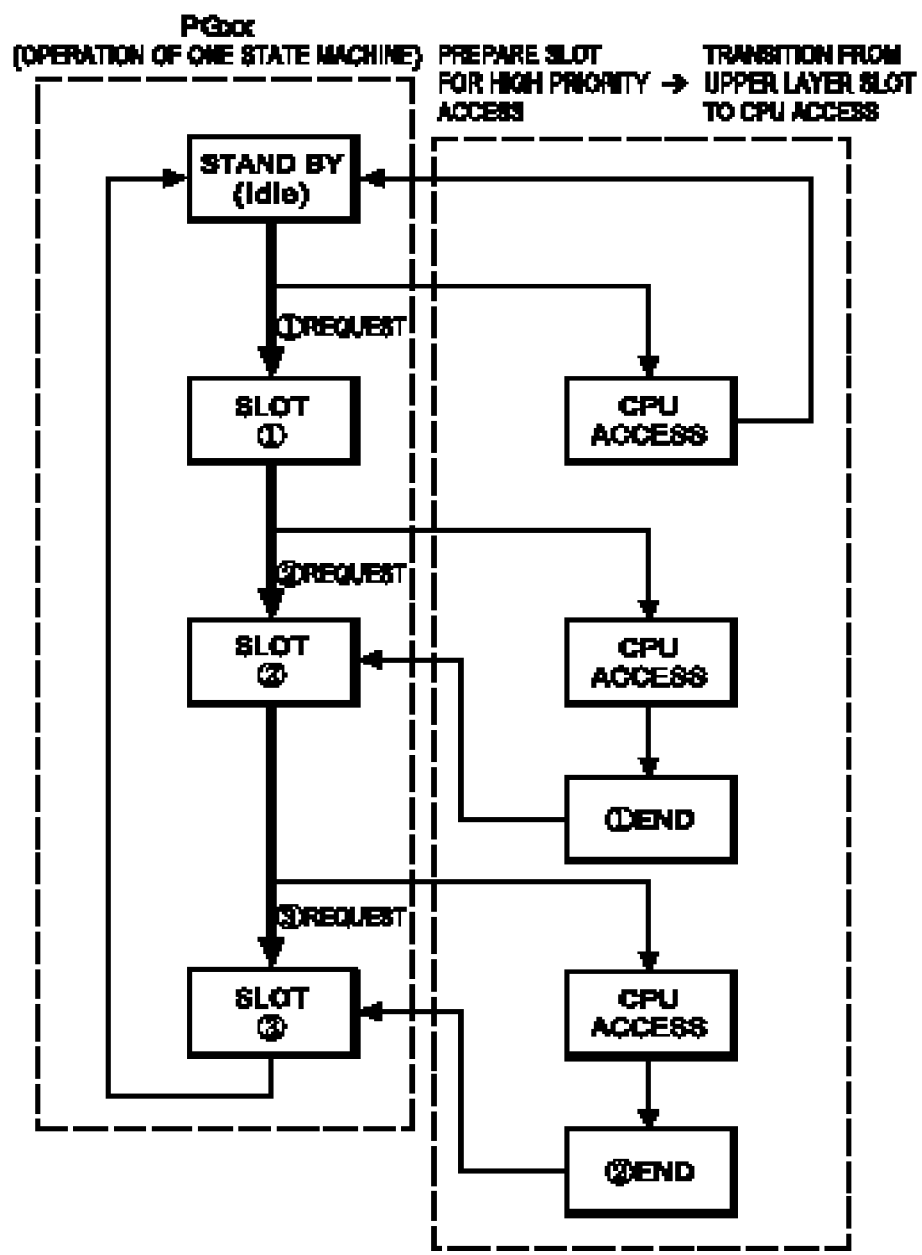
FIG. 8 illustrates upper-layer slots used for inserting a processor access either in an idle slot of one of state machines or in the transition between two transfer blocks in arbitrating access to shared memory according to embodiments of the present invention.

FIG. 8 illustrates upper-layer slots used for inserting a processor access either in an idle slot of one of the state machines (PG1-8) or in the transition between two transfer blocks. Transfers of functional blocks other than a processor access are assigned to the slots of the state machines (PG1-8) and allowed sequentially. A processor access may cut in at any position of these state machines, based on the premise that the processor access is started after the process of the transfer already started at the time of the cut-in is finished. The arbiter inserts a processor access request upon receiving the processor access request during the transfer by the N state machines (PG1-8 of FIG. 7). Once the process of the processor access is finished, the arbiter shifts its control to the next slot in the same state machine. The state machine mechanism described above allows setting the order of accesses (priority) in a round-robin cycle in a programmable way, and thus achieves the arrangement of transfer blocks with improved transfer efficiency.

Upper Limit Setting for Bandwidth of Memory Access (CPU Access) by Processor

The programmable arbiter allows a processor main memory access to cut in any number of times at any position in a round-robin cycle. However, a processor access may interfere with bandwidths of the other access blocks if there is no limitation. To avoid this, the arbiter sets an upper limit in accordance with transfer bandwidths required for the respective functional blocks. The arbiter sets the maximum number of allowed processor access times and the transfer bandwidth of the processor access (processor transfer length) in a programmable way by comparing transfer data amounts (the number of transfer blocks) of the respective functional blocks with one another.

In a case where the processor is a PowerPC (PPC405), the data transfer unit per processor access indicated by the box "C" in FIG. 6 is defined by the access of a cache line including four executive instructions. The size of one processor access is determined by the width of this cache line, and is given by the cache line size. In the case where the processor is a PowerPC (PPC 405), for example, the processor has a cache line size of 32 bytes, and thus has an instruction length of four bytes. In the case of using an MPU manufactured by Intel Corporation, 64 bytes or 128 bytes which is a cache line size of the MPU is required per one processor access. In the case of the PPC405, eight instructions corresponding to one cache line are executed per one processor access (each instruction is four bytes). Although the transfer of instructions corresponding to multiple cache lines may be executed at one time in one processor access, the number of instructions to be transferred is limited to a certain number or smaller for the sake of the securing of bandwidths for multiple data flows.

Setting of Burst Transfer Length (Transfer Block Length) of Data Flows

The programmable arbiter provides each access block with priority of transfer. Then, in the ASIC controller (buffer manager) controlling DRAM commands, each access block can continue its transfer for the maximum burst length granted to the transfer. If this length is large, the overhead caused by the DRAM transfer can be reduced and accordingly the bus usage efficiency can be improved; however, a processor access request needs to wait during this period (latency). For this reason, it is essential to balance between the latency and the required transfer bandwidth. By making the burst length (transfer block length) configurable, it is possible to adjust the optimal balance therebetween.

The tape drive (the fifth-generation Linear Tape Open (LTO)) grants each of a host transfer and a tape transfer 256 bytes as the predetermined maximum transfer length (transfer block length). Since a host transfer is fast (high-bandwidth transfer), a larger number of slots is assigned to the host transfer to meet the required transfer bandwidth. The predetermined transfer length of 256 bytes corresponds to 32 bursts of the external buffer (DDR2 SDRAM). The burst transfer unit larger than this transfer block length results in deterioration in the performance of the drive due to the processor access latency. In contrast, the burst transfer unit smaller than this transfer block length does not meet a bandwidth (transfer rate) required for a host transfer and the like.

The bus transfer unit is calculated from the number of clocks needed for the transfer at the DDR2 SDRAM. For example, consider a case where a 256-byte transfer is executed at the DDR2 SDRAM with a bus width of eight bytes, and the number of clocks required for the transfer is 29. In this case, if the clock frequency is 200 MHz (i.e., five nanoseconds per clock), the processor access latency is 29×5 ns=145 ns.

A processor access starts its transfer after waiting for this period of time. In the case of a practical CPU (such as PPC405), it takes about 280 ns. If the burst length is 128 bytes, the number of clocks is 21 and thus the CPU waiting time is 21×5 ns=110 ns. A small burst length increases the overhead and reduces a usable bandwidth. This results in lack of required speed and deterioration of performance.

To sum up the example of the tape drive described above, the transfer units for transfer blocks of each data flow and for a CPU access are given as follows. A CPU access is granted, as its upper limit, eight times in one round-robin cycle with a transfer length of 32 bytes per access. A transfer block length of 256 bytes is equally granted to each of a host transfer, a tape transfer, and an ECC transfer. A transfer block length of 64 bytes is granted to a DSIT access which is a low-bandwidth access. Although depending on the interface, the number of transfers of transfer blocks granted to a host transfer is typically four. It is essential for a data flow transfer from each functional block which is assigned multiple times how randomly the assigned transfer blocks are deployed. For example, if slots for a host transfer which is executed four or five times are uniformly deployed, it is possible to meet not only a required host transfer rate but also required transfer rates of the other functional blocks.

The example has been described above taking a tape drive as an example. However, the present invention is also applicable to an information apparatus which is executed using a memory shared by data flow accesses and CPU accesses. The present invention allows sharing a memory between a processor and multiple data flow blocks, and thereby reducing the size of an information apparatus and saving power consumption. The present invention also has an advantage of minimizing the CPU execution delay while meeting required data rates of all data buffers.

In view of the explanations set forth above, readers will recognize that the benefits of arbitrating access to a shared memory according to embodiments of the present invention include:

sharing a memory between a processor and multiple data flow blocks, thereby reducing the size of an information apparatus and saving power consumption, and providing an architecture with which the processor access delay can be minimized while required data rates of all data buffers are met.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A memory access device for allowing a shared memory to be used both as a buffer for data flows and as a main memory for a processor, the device comprising a memory, a plurality of functional blocks each of which handles a data flow from and to the memory, a processor which uses the memory as a main memory, and an arbiter unit which arbitrates among accesses to the memory from the functional blocks and the processor, wherein the arbiter unit:

makes assignment for access requests to the memory from the plurality of functional blocks in units of predetermined transfer lengths sequentially in a round-robin fashion, divides each of data transfers from the functional blocks into transfer blocks of a predetermined transfer length (transfer block length), and transfers the transfer blocks in one round-robin cycle in accordance with bandwidths required for the data transfers from the functional blocks, sets a priority of each of the plurality of transfer blocks of the data transfers in a programmable way so that the transfer blocks from the functional blocks have different priorities and that the bandwidths required for the data transfers from all the functional blocks are met by alternate transfer of the transfer blocks from the different functional blocks, and executes an access from the processor with an upper limit set for the number of access times from the processor to the memory in one round-robin cycle so that the access from the processor with the highest priority and with a predetermined processor transfer length exerts less effect on bandwidths for data flow transfers from the functional blocks in predetermined intervals between the transfer blocks.

2. The device according to claim 1, wherein:
the arbiter unit defines the round-robin cycle as a plurality of state machines in a stand-by (idle) state, the state machines receiving the access requests from the functional blocks, and each including a plurality of slots used for connecting the access requests from the functional blocks to each other in series in the order of priority, and
the setting of the priority of each of the transfer blocks of the data transfers in a programmable way includes assigning the transfer blocks to the slots in the state machines in accordance with the set priority upon receipt of the access requests of the transfer blocks of the data transfers from the functional blocks.

3. The device according to claim 1 wherein the transfer block length is set to a value which meets the bandwidths for the data transfers of the functional blocks, and which reduces latency of the access from the processor.

4. The device according to claim 3 wherein, when the access from the processor occurs while any one of the state machines is in operation, the arbiter unit switches to and executes the access from the processor after completion of the transfer of the transfer block from the functional block executed when the access from the processor occurs, the transfer block being assigned to any one of the slots in the state machine, and also limits the number of access times from the processor in the one round-robin cycle.

5. The device according to claim 4 wherein, upon receiving the access request from the processor during the access by any one of the functional blocks or during standby (idle), the arbiter unit executes the access request from the processor during the standby of the state machines or during transition between the slots.

6. The device according to claim 5 wherein the arbiter unit defines the round-robin cycle as eight of the state machines, and each of the state machines includes three of the slots.

7. The device according to claim 6, wherein:
the processor transfer length per access by the processor is given as a value of a cache line width of the processor, and
the transfer block length is set to meet transfer rate requirements of the functional blocks, on the basis of a bus width and a clock for transfer in the memory.

8. The device according to claim 1 wherein the memory access device is comprised within an information apparatus.

9. The device according to claim 8 wherein:
the information apparatus is a tape recorder,
the functional blocks include a data flow to a tape medium, a data flow to a host, a CPU buffer access, and an error correcting code ECC,
the processor transfer length per access by the processor is 32 bytes when the cache line of the processor holds 32 bytes, and
the transfer block length for the data transfers from the functional blocks is given as 256 bytes when the memory is a double data rate, type-2, synchronous dynamic random access memory (DDR2 SDRAM).

10. A memory access arbitration method for allowing a shared memory to be used both as a buffer for data flows and as a main memory for a processor, in an information apparatus including a memory, a plurality of functional blocks each of which handles a data flow from and to the memory, and a processor which uses the memory as a main memory, the method comprising:

making assignment for access requests to the memory from the plurality of functional blocks in units of predetermined transfer lengths sequentially in a round-robin fashion, dividing each of data transfers from the functional blocks into transfer blocks of a predetermined transfer length (transfer block length), and transferring the transfer blocks in one round-robin cycle in accordance with bandwidths required for the data transfers from the functional blocks, setting a priority of each of the plurality of transfer blocks of the data transfers in a programmable way so that the transfer blocks from the functional blocks have different priorities and that the bandwidths required for the data transfers from all the functional blocks are met by alternate transfer of the transfer blocks from the different functional blocks, and executing an access from the processor with an upper limit set for the number of access times from the processor to the memory in one round-robin cycle so that the access from the processor with the highest priority and with a predetermined transfer length (processor transfer length) exerts less effect on bandwidths for data flow transfers from the functional blocks in predetermined intervals between the transfer blocks.

11. A memory access arbitration computer program product for allowing a shared memory to be used both as a buffer for data flows and as a main memory for a processor, in an information apparatus including: a memory; a plurality of functional blocks each of which handles a data flow from and to the memory; and a processor which uses the memory as a main memory, the computer program product comprising computer program instructions, disposed upon a recordable, computer-readable storage medium, that when executed cause the processor to function by:

making assignment for access requests to the memory from the plurality of functional blocks in units of predetermined transfer lengths sequentially in a round-robin fashion, dividing each of data transfers from the functional blocks into transfer blocks of a predetermined transfer length (transfer block length), and transferring the transfer blocks in one round-robin cycle in accordance with bandwidths required for the data transfers from the functional blocks, setting a priority of each of the plurality of transfer blocks of the data transfers in a programmable way so that the transfer blocks from the functional blocks have different priorities and that the bandwidths required for the data transfers from all the functional blocks are met by alternate transfer of the transfer blocks from the different functional blocks, and executing an access from the processor with an upper limit set for the number of access times from the processor to the memory in one round-robin cycle so that the access from the processor with the highest priority and with a predetermined transfer length (processor transfer length) exerts less effect on bandwidths for data flow transfers from the functional blocks in predetermined intervals between the transfer blocks.

* * * * *